(12) United States Patent
Saito

(10) Patent No.: US 8,311,340 B2
(45) Date of Patent: Nov. 13, 2012

(54) DOCUMENT PROCESSING DEVICE, DOCUMENT PROCESSING SYSTEM, COMPUTER READABLE MEDIUM, AND DOCUMENT PROCESSING METHOD

(75) Inventor: Kazuo Saito, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 416 days.

(21) Appl. No.: 12/692,308

(22) Filed: Jan. 22, 2010

(65) Prior Publication Data

US 2011/0019926 A1    Jan. 27, 2011

(30) Foreign Application Priority Data

Jul. 22, 2009    (JP) ................. 2009-170784

(51) Int. Cl.
G06K 9/60    (2006.01)
G06E 1/00    (2006.01)
(52) U.S. Cl. ............................ 382/218; 382/305; 706/20
(58) Field of Classification Search .................. 382/218, 382/305; 706/20; 702/19; 235/379; 726/26
See application file for complete search history.

(56) References Cited

U.S. PATENT DOCUMENTS

| | | | |
|---|---|---|---|
| 5,583,941 A | 12/1996 | Yoshida et al. | |
| 6,229,866 B1 * | 5/2001 | Kim | 375/377 |
| 8,056,140 B2 * | 11/2011 | Fukuta | 726/26 |
| 2005/0251347 A1 * | 11/2005 | Perona et al. | 702/19 |
| 2007/0174896 A1 | 7/2007 | Furuya et al. | |
| 2009/0261158 A1 * | 10/2009 | Lawson | 235/379 |
| 2009/0313194 A1 * | 12/2009 | Amar et al. | 706/20 |

FOREIGN PATENT DOCUMENTS

| | | |
|---|---|---|
| JP | A-2003-263084 | 9/2003 |
| JP | B2-3493522 | 11/2003 |
| JP | 2007-199909 | 8/2007 |

* cited by examiner

*Primary Examiner* — Sheela Chawan
(74) *Attorney, Agent, or Firm* — Oliff & Berridge, PLC

(57) ABSTRACT

A document processing device includes: an extraction unit that extracts a first image of an element from a read image of a medium to which the element is affixed; an accepting unit that accepts first information for specifying processing to be performed to a document, the first information being to be associated with the first image of the element; a determination unit that determines whether an image of an element identical to or similar to the first image of the element has been registered in a memory, or not; and a registration unit that registers the first image of the element and the first information for specifying the processing in association with each other in the memory when the determination unit determines that the image of the element identical to or similar to the first image of the element has not been registered in the memory.

7 Claims, 17 Drawing Sheets

FIG.7

DATA STRUCTURE OF SECURITY POLICY DB

| POLICY ID | POLICY NAME | USAGE RANGE | LICENSED FUNCTION | STAMP IMAGE | IMAGE FEATURE DATA |
|---|---|---|---|---|---|
| 0001 | TOP SECRET | CREATOR | VIEWING, PRINT, SAVE | TOP SECRET | IMAGE FEATURE DATA OF "TOP SECRET" STAMP |
| | | CHIEF OF DEPARTMENT | VIEWING | | |
| 0002 | EXTERNAL USE PROHIBITED | CREATOR | VIEWING, AUTHORIZED PRINT, SAVE | EXTERNAL USE PROHIBITED | IMAGE FEATURE DATA OF "EXTERNAL USE PROHIBITED" STAMP |
| | | CHIEF OF DEPARTMENT | VIEWING, PRINT | | |
| | | REGULAR EMPLOYEE | VIEWING | | |
| ⋮ | ⋮ | | | | ⋮ |

FIG.8

DATA STRUCTURE OF DOCUMENT INFORMATION DB

| DOCUMENT ID | POLICY ID | CREATOR ID | CREATION DATE AND HOUR |
|---|---|---|---|
| 40faaa4-0fb6-4634-85bf-bba45bc941b5 | 0001 | USER A | 2009 YEAR MONTH 30 DAY 10:00 |
| 4FB6BB00-3347-11d0-B40A-00AA005FF586 | 0002 | USER B | 2009 YEAR 8 MONTH 31 DAY 10:00 |
| AED6483F-3304-11d2-86F1-006008B0E5D2 | 0002 | USER C | 2009 YEAR 9 MONTH 12 DAY 10:00 |
| FDF9C30D-CCAB-3E2D-B584-9E24CE8038E3 | 0002 | USER D | 2009 YEAR 9 MONTH 15 DAY 10:00 |
| ... | ... | ... | ... |

WHEN FRAME SHAPE IS DIFFERENT

WHEN CHARACTER WRITING DIRECTION IS DIFFERENT

WHEN LANGUAGE IS DIFFERENT

WHEN COLOR IS DIFFERENT

WHEN CHARACTER WRITING DIRECTION AND FRAME SHAPE ARE DIFFERENT

EXPRESSION IS DIFFERENT

FIG. 18

DATA STRUCTURE OF STAMP DB

| STAMP ID | STAMP NAME | STAMP IMAGE | IMAGE FEATURE DATA |
|---|---|---|---|
| 1 | TOP SECRET | (TOP SECRET) | IMAGE FEATURE DATA OF "TOP SECRET" STAMP |
| 2 | EXTERNAL USE PROHIBITED | (EXTERNAL USE PROHIBITED) | IMAGE FEATURE DATA OF "EXTERNAL USE PROHIBITED" STAMP |
| ... | ... | | ... |

FIG. 19

DATA STRUCTURE OF SECURITY POLICY DB

| POLICY ID | POLICY NAME | USAGE RANGE | LICENSED FUNCTION | STAMP ID |
|---|---|---|---|---|
| 0001 | TOP SECRET | CREATOR | VIEWING, PRINT, SAVE | 1 |
| | | CHIEF OF DEPARTMENT | VIEWING | |
| 0002 | EXTERNAL USE PROHIBITED | CREATOR | VIEWING, AUTHORIZED PRINT, SAVE | 2 |
| | | CHIEF OF DEPARTMENT | VIEWING, PRINT | |
| | | REGULAR EMPLOYEE | VIEWING | |
| ... | | | | ... |

DOCUMENT PROCESSING DEVICE, DOCUMENT PROCESSING SYSTEM, COMPUTER READABLE MEDIUM, AND DOCUMENT PROCESSING METHOD

CROSS-REFERENCE TO RELATED APPLICATION

This application is based on and claims priority under 35 USC 119 from Japanese Patent Application No. 2009-170784 filed Jul. 22, 2009.

BACKGROUND

1. Technical Field

The present invention relates to a document processing device, a document processing system, a computer readable medium, and a document processing method.

2. Related Art

There has been known a document processing device that reads a paper document having a stamp affixed thereto and executes predetermined processing in accordance with the type of the stamp. For example, it is assumed that the predetermined processing is processing of setting a security policy

SUMMARY

According to an aspect of the invention, there is provided a document processing device including: an extraction unit that extracts a first image of an element from a read image of a medium to which the element is affixed; an accepting unit that accepts first information for specifying processing to be performed to a document, the first information being to be associated with the first image of the element; a determination unit that determines whether an image of an element identical to or similar to the first image of the element has been registered in a memory, or not; and a registration unit that registers the first image of the element and the first information for specifying the processing in association with each other in the memory when the determination unit determines that the image of the element identical to or similar to the first image of the element has not been registered in the memory.

BRIEF DESCRIPTION OF THE DRAWINGS

An exemplary embodiment of the present invention will be described in detail based on the following figures, wherein:

FIG. 7 is a diagram showing an example of the data structure of a security policy data base in the first exemplary embodiment;

FIG. 8 is a diagram showing an example of the data structure of a document information data base in the first exemplary embodiment;

FIG. 18 is a diagram showing an example of the data structure of a stamp data base of the second exemplary embodiment;

FIG. 19 is a diagram showing an example of the data structure of the security policy data base of the second exemplary embodiment.

DETAILED DESCRIPTION

Exemplary embodiments according to the present invention will be described with reference to the accompanying drawings.

First Exemplary Embodiment

Figure 1:
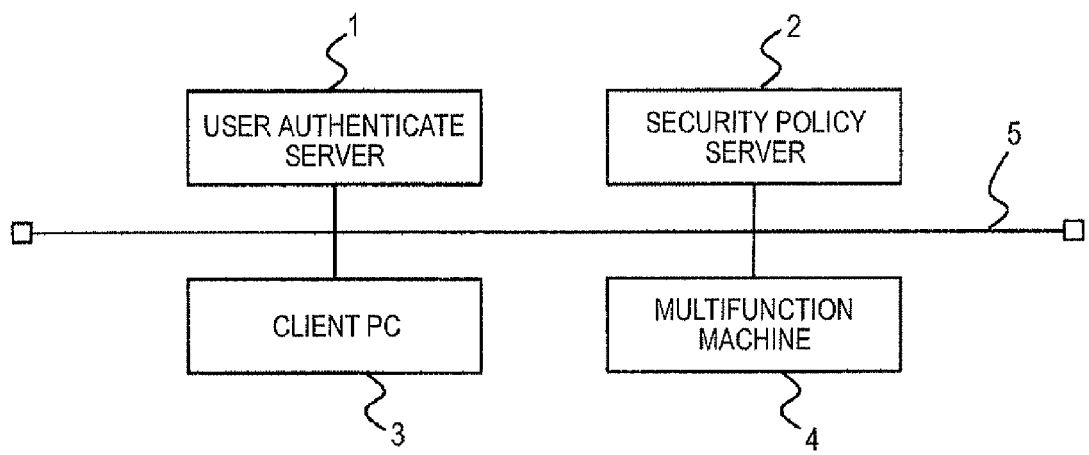
FIG. 1 is a diagram showing the overall configuration of a document processing system according to a first exemplary embodiment.

FIG. 1 is a diagram showing the overall construction of a document processing system according to a first exemplary embodiment. The document processing system of this exemplary embodiment manages the security of a paper document by associating a stamp image affixed to the paper document with a security policy.

FIG. 1 shows the configuration that a user certificate server 1, a security policy server 2, a client PC 3 and a multifunction machine 4 are connected to a network 5. The user certificate server 1 is a server for unifying management of user authentication. The other devices such as the multifunction machine 4 are controlled to be usable on the basis of user authentication. At this time, the devices certificate a user by inquiring to the user certificate server 1.

The user certificate server 1 may be an LDAP server, a server of Windows (registered trademark) Active Directory or the like. The security policy server 2 has a role of managing access rights to electronic documents protected by security (hereinafter referred to as "protected documents"). For example, the security policy server 2 may be an existing server of Windows (registered trademark) Rights Management Services of Microsoft Corporation, LiveCycle Policy Service of Adobe Systems or the like.

The client PC 3 communicates with the security policy server 2, and operates a document application for executing processing such as viewing or edition on a protected electronic document in a range permitted on a security policy. The multifunction machine 4 is one kind of image forming apparatuses having various functions such as a print function or a scan function. When a stamped paper document is read in the multifunction machine 4, the multifunction machine 4 communicates with the security policy server 2 to select a security policy (hereinafter referred to as "policy") associated with a stamp extracted from a read image of the stamped paper document, and a stamp recognizing scan protecting application for protecting an electronic document (read image) is operated. Furthermore, a stamp registering application for newly registering a stamp which is required to be automatically recognized is operated.

Figure 2:
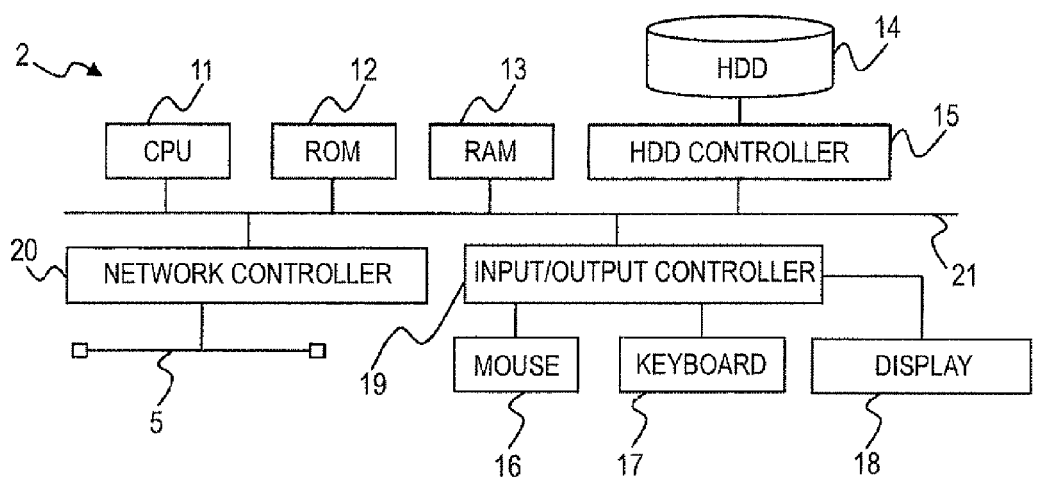
FIG. 2 is a diagram showing a hardware configuration of a server computer forming a security policy server of the first exemplary embodiment.

FIG. 2 is a diagram showing the hardware configuration of the server computer constituting the security policy server 2 according to the exemplary embodiment. In this exemplary embodiment, the computer constituting the security server 2 can be implemented by a general-purpose existing hardware configuration. That is, the computer is configured by connecting, through an internal bus 21, a CPU 11, a ROM 12, a RAM 13, an HDD controller 15 connected to a hard disk drive (HDD) 14, an input/output controller 19 through which a mouse 16 and a keyboard 17 provided as an input unit and a display 18 provided as a display device are connected to one other, and a network controller 20 provided as a communication unit.

The user certificate server 1 and the client PC3 are also computers, and thus they can be configured to have the same construction as shown in FIG. 2.

Figure 3:
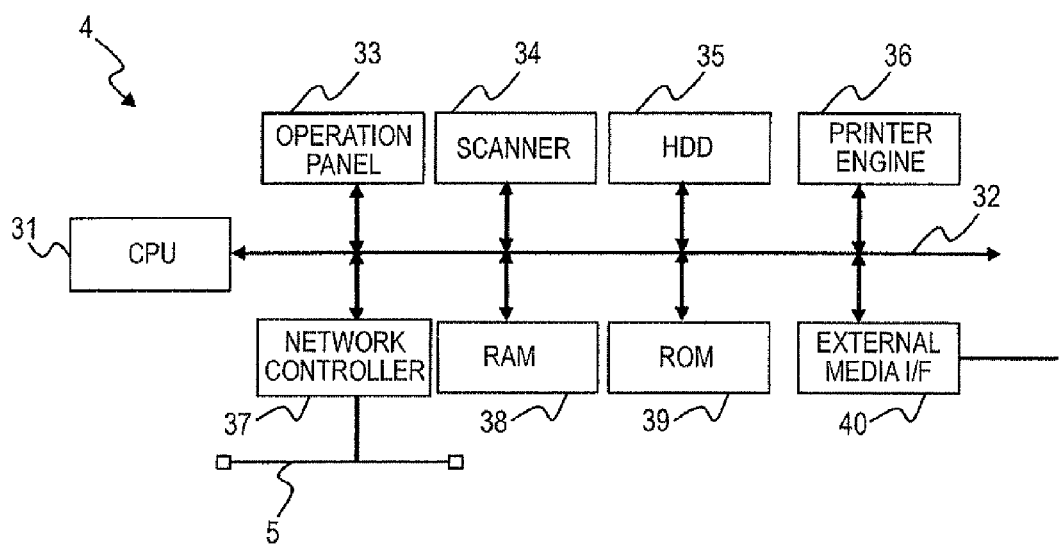
FIG. 3 is a diagram showing a hardware configuration of a multifunction machine of the first exemplary embodiment.

FIG. 3 is a diagram showing the hardware configuration of the multifunction machine 4 of the exemplary embodiment. The multifunction machine 4 is a kind of image forming apparatus having various kinds of functions such as a print function or a scan function as described above, and contains a computer therein. In FIG. 3, a CPU 31 controls the operation of various kinds of mechanisms mounted in the this apparatus such as a scanner 34 or a printer engine 36 according to programs stored in ROM 39. An address data bus 32 is connected to various kinds of mechanisms as control targets of the CPU 31 to perform data communication with these mechanisms. An operation panel 33 accepts an instruction from a user and displays information. The scanner 34 reads an original document set by a user to accumulate the read data as electronic data in an HDD (Hard Disk Drive) 35 or the like. The HDD 35 stores an electronic document, etc. read by using the scanner 34. The printer engine 36 prints an image on output paper (sheet) according to an instruction from a control program executed by the CPU 31. A network controller 37 is connected to the network 5 and used for reception of a print image or the like. RAM 38 is used as a work memory when a program is executed or as a communication buffer when electronic data are transmitted or received. Various kinds of programs concerning the control and security of this apparatus are stored in ROM 39. Various constituent elements described later exercise predetermined processing functions by executing various kinds of programs. An external media interface (I/F) 40 is an interface with external memory equipment such as an USB memory or a flash memory.

Figure 4:
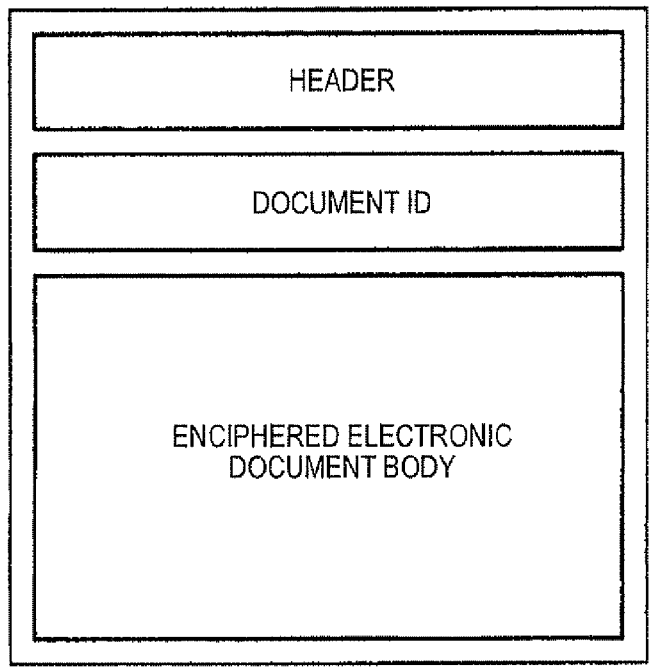
FIG. 4 is a diagram showing an example of a format of a protected document to be handled in the first exemplary embodiment.

FIG. 4 is a diagram showing an example of the format of a protected document to be handled in this exemplary embodiment. The protected document is constructed by a header representing "protected document" (a predetermined byte array having a specific length), a document ID and an enciphered document body. Protected documents in this exemplary embodiment are based on the assumption that they are enciphered by an encryption key common to all the electronic documents. However, this is an example, and the encryption key may be changed every document as in the case of a DRM (Digital Rights Management) technique. Furthermore, in order to prevent a document ID from being replaced by another document ID, an electronic signature may be provided to the whole document or a value such as HMAC (Keyed-Hashing for Message Authentication Code) may be provided to the document. At any rate, this system has no constraint except that all the protected documents are identified by identifiers and this is managed by policy.

Figure 5:
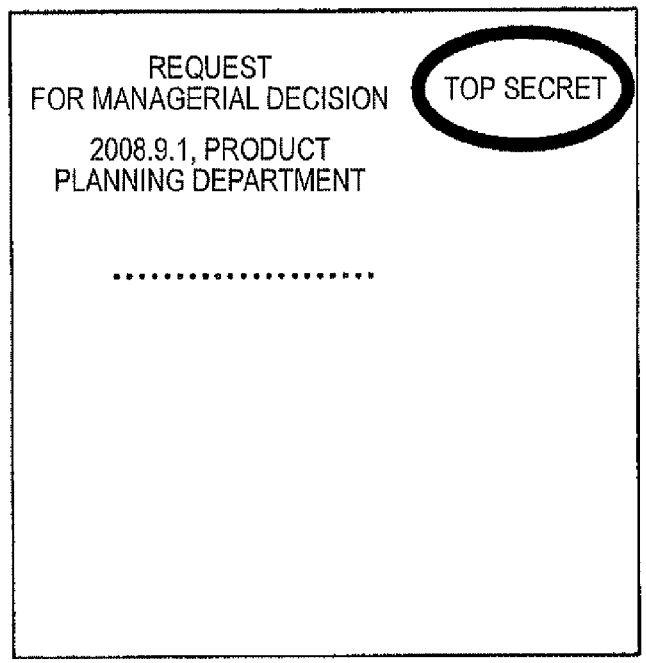
FIG. 5 is a diagram showing an example of a paper document as a reading target in the first exemplary embodiment.

FIG. 5 is a diagram showing an example of a paper document as a reading target in the exemplary embodiment. A stamp representing a security policy is affixed to a part of the paper document of FIG. 5. In this case, a stamp "top secret" is affixed to the paper document.

Figure 6:
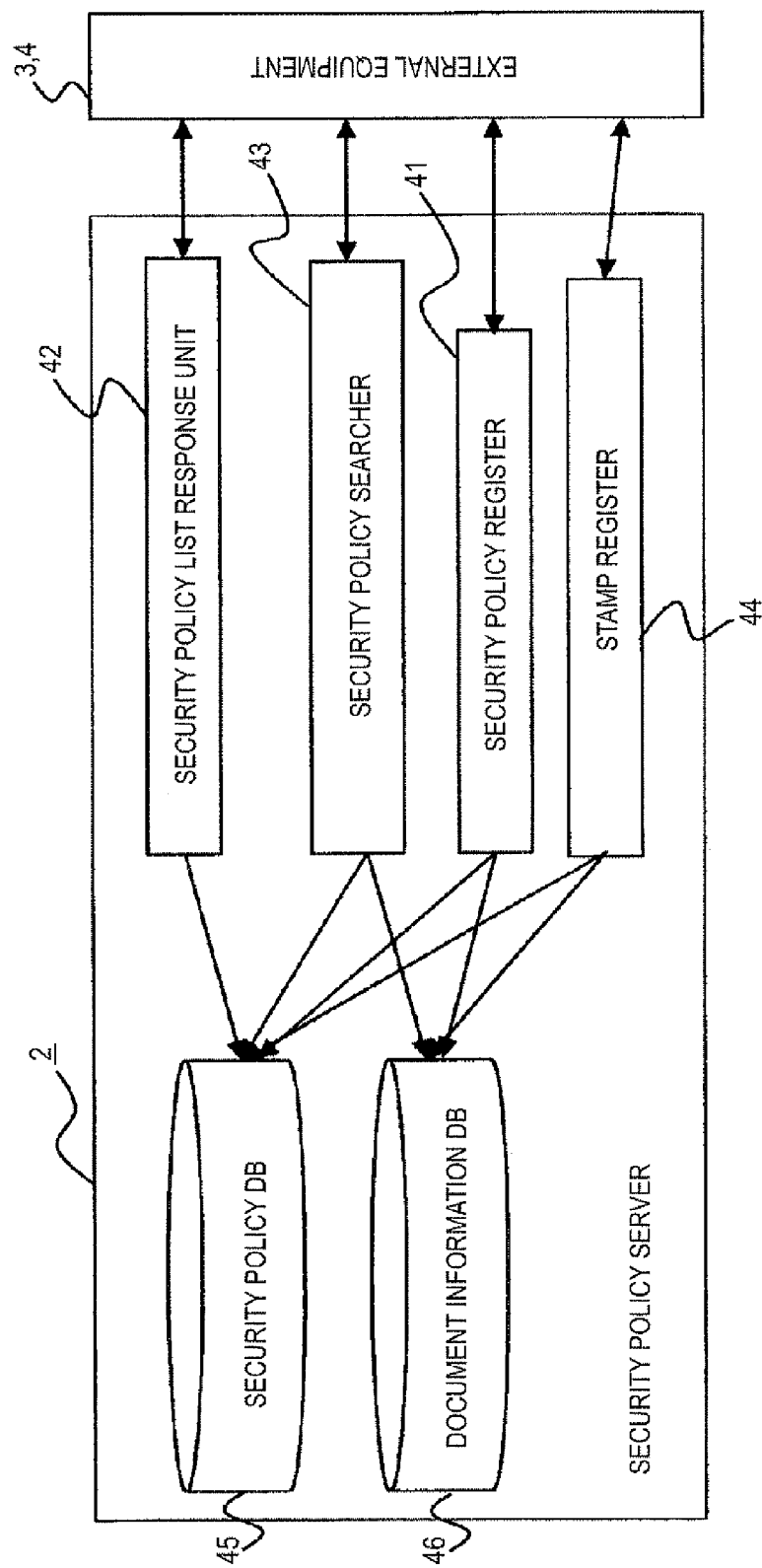
FIG. 6 is a block diagram showing the security policy server of the first exemplary embodiment.

FIG. 6 is a block diagram showing the security policy server 2 according to the exemplary embodiment. The security policy server 2 shown in FIG. 6 includes a security policy register 41, a security policy list response unit 42, a security policy searcher 43, a stamp register 44, a security policy data base (DB) 45 and a document information data base (DB) 46. In response to a registration request transmitted from the multifunction machine 4 and the client PC 3 (hereinafter generically referred to as "external equipment"), the security policy register 41 adds, to the document information data base 46, respective item data of a document ID, a policy ID, a creator ID and a creation date and hour which are designated by the registration request as a new record. In this exemplary embodiment, a UUID (Universally Unique IDentifier) is used as the document ID so that it does not conflict at the outside), and thus it is unnecessary to check whether data of an indicated document ID exists or not on the data base. However, it may be checked.

In this exemplary embodiment, the security policy list response is a function of inquiring from external equipment about a list representing applicable policies when the external equipment applies a policy to a document. In response to this inquiry, the security policy list response unit 42 searches policy data registered in the security policy data base 45, creates a list of policies matched with a search condition and returns the list to an inquirer. When the external equipment inquires about a policy to the security policy server 2, the external equipment may indicate a user ID to which the policy is applied. In this case, it may be checked whether the user concerned is contained in a predetermined registrable user list. Alternatively, a user list in which each policy is registered may be provided every policy and checked.

In this exemplary embodiment, the security policy search is a function of inquiring from external equipment about security policy information concerning a document on which a policy has been already set. At this time, the external equipment inquires about the security policy information while specifying the document ID of a document being inquired and the user ID of the inquiring user. In response to this inquiry, the security policy searcher 43 returns the corresponding policy to the inquirer.

In response to a registration request in which policy ID and an image of a stamp (hereinafter referred to as "stamp image") are specified, the stamp register 44 associates the policy ID with the stamp image and image feature data of the stamp image concerned and registers these data into the security policy data base 45.

The security policy server 2 holds the security policy data base 45 as a data base for managing a security policy (as to what right should be permitted to whom), and also the document information data 46 as a data base for managing document information (as to which document should be allocated to which security policy, who created a document and when the document was created). The data bases 45 and 46 will be described in detail with reference to FIGS. 7 and 8.

FIG. 7 is a diagram showing an example of the data structure of the security policy data 45 of the exemplary embodiment. A user (usage-permitted person), a licensed (usable) function, and policy information are set in association with a policy ID for identifying a policy and the name of the policy concerned in the security policy data base 45. The user and the licensed function serve to set what access should be permitted to whom, and the policy information is constructed by associating a stamp image allocated to the policy concerned with image feature data of the stamp image concerned. In this exemplary embodiment, a feature amount is determined as the image feature data of the stamp image, and the image feature data of the stamp image is compared to determine "same or difference" of the stamp image. However, in order to omit repetitive calculation of calculating a feature amount every comparison, the feature amount of the stamp image which is once determined is registered in the security policy data base 45.

FIG. 8 is a diagram showing an example of the data structure of the document information data base 46 of the exemplary embodiment. In this exemplary embodiment, the document information data base 46 is used because a document is treated as policy-setting target data. A document ID as an identifier for a document (represented by the UUID in this case), the policy ID of a security policy to which the document is pursuant, the user ID of a user creating the document (creator ID), the creating date and hour of the document, more accurately the date and hour at which a policy is applied to the created document are registered in association with one another in the document information data base 46. For example, in FIG. 8, in the case of a document on a third lane (a record whose document ID starts from "AED6"), a user to which a user ID "UserC" is allocated applies a policy having a policy ID "0002" at 10:00 on Sep. 12, 2009, whereby the document concerned was created. The data base of the policy and the document information as described above can be implemented by an existing technique, and the data base is not limited to the data structure shown in FIG. 8 insofar as it can apply a security policy every document.

The respective constituent elements 41 to 44 of the security policy server 2 are implemented by the cooperative operation of a computer mounted in the security policy server 2 and a program operated in the CPU 11 mounted in the computer. Furthermore, each of the data bases 45 and 46 is implemented by an HDD 14 mounted in the computer.

Figure 9:
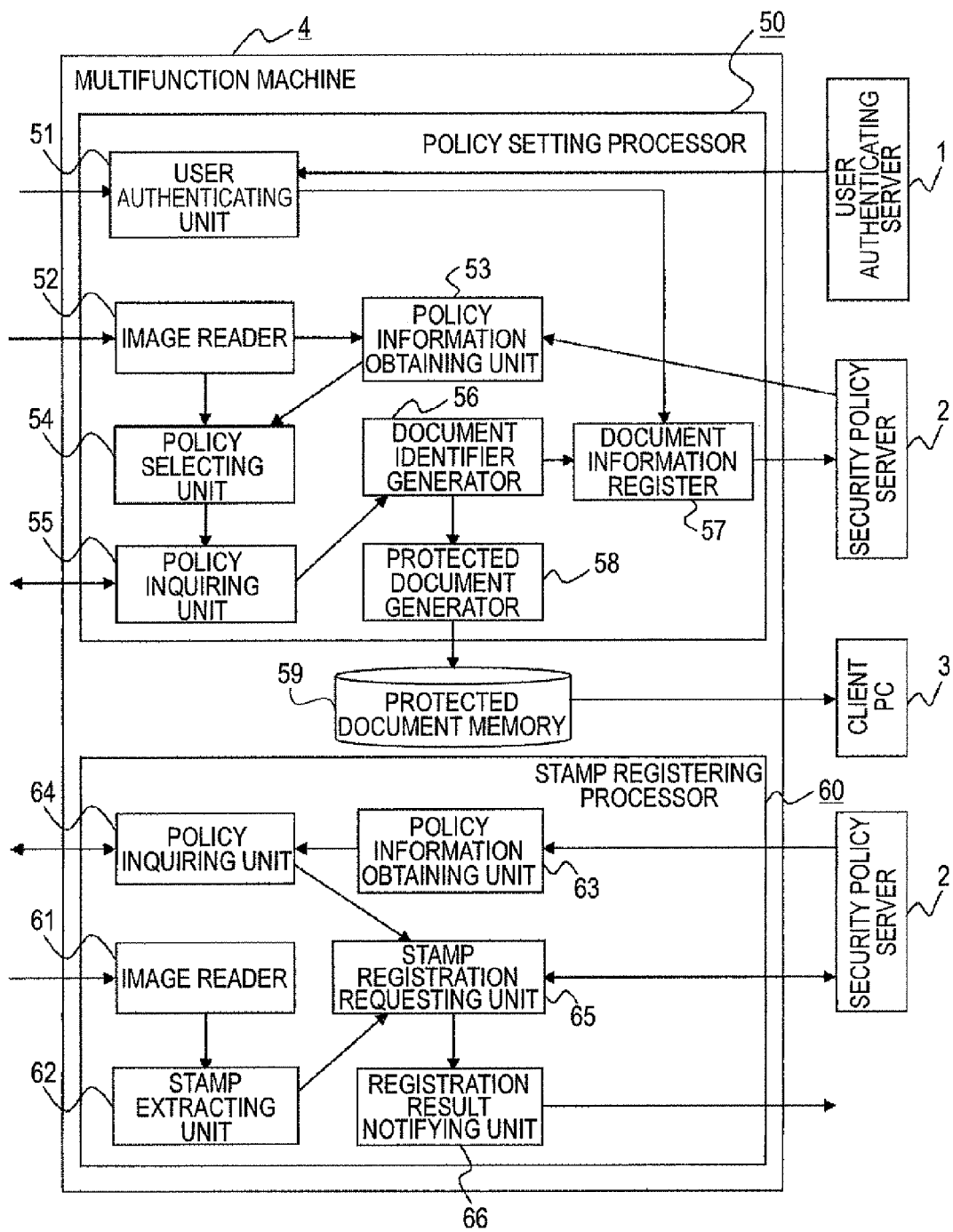
FIG. 9 is a block diagram showing a multifunction machine according to the first exemplary embodiment.

FIG. 9 is a block diagram showing the multifunction machine 4 according to the exemplary embodiment. The multifunction machine 4 includes a policy setting processor for supplying the function of a document protecting application to thereby set a security policy to an electronic document obtained by reading a paper document, and a stamp registration processor 60 for supplying the function of a stamp registering application to register a stamp image and a policy in association with each other. The configuration concerning functions provided to the multifunction machine 4 which are not particularly described in this exemplary embodiment is omitted from FIG. 9. In FIG. 9, data flow is represented by arrows, and plural security policy servers 2 are illustrated so that lines do not intricately cross one another.

The policy setting processor 50 includes a user authentication unit 51, an image reader 52, a policy information obtaining unit 53, a policy selector 54, a policy inquiring unit 55, a document identifier generator 56, a document information register 57 and a protected document generator 58. The user authentication unit 51 inquires to the user certificate server 1 to execute user authentication. The image reader 52 reads a paper document by using the scanner 34. The policy information obtaining unit 53 transmits a policy list obtaining request to the security policy server 2 to obtain a policy list. The policy selector 54 selects a policy associated with the same stamp image as an image of a stamp affixed to an electronic document read by the image reader 52 from policies contained in the policy list obtaining request. The policy inquiring unit 55 inquires to a user about the policy to be associated with the stamped paper document. The document identifier generator 56 generates a document identifier. The document information registering unit 57 transmits a registration request to the security policy server 2 to register document information concerning the read paper document into the document information data base 46. The protected document generator 58 allocates a document ID to the electronic document of the read paper document and encrypts the electronic document to generate the protected electronic document.

The stamp registration processor 60 includes an image reader 61, a stamp extracting unit 62, a policy information obtaining unit 63, a policy inquiring unit 64, a stamp registration requesting unit 65 and a registration result notifying unit 66. The image reader 61 reads a stamp registering form by using the scanner 34. The stamp extracting unit 62 extracts the stamp image from the read image of the stamp registering form. The policy information obtaining unit 63 transmits a policy list obtaining request to the security policy server 2 to obtain a policy list. The policy inquiring unit 64 inquires to the user about the policy to be associated with the stamp to be registered. The stamp registering requesting unit 65 transmits a stamp registering request to the security policy server 2 to register the image of the stamp and the policy in association with each other. The registration result notifying unit 66 notifies the user of an execution result of the registration processing executed by the security policy server 2 in accordance with the stamp registration request.

The respective constituent elements 50 and 60 in the multifunction machine 4 are implemented by the cooperative operation between the computer mounted in the multifunction machine 4 and the programs operated in the CPU 31 mounted in the computer. A protected document storing unit (memory) 59 is implemented by the HDD 35 mounted in the multifunction machine 4.

Furthermore, the programs used in this exemplary embodiment may be supplied not only through a communication unit, but also by storing the programs into a computer-readable recording medium such as CD-ROM, DVD-ROM. The programs supplied from the communication unit or the recording medium are installed into the computer, and a CPU of the computer successively executes the installed programs to implement various kinds of processing.

Figure 10:
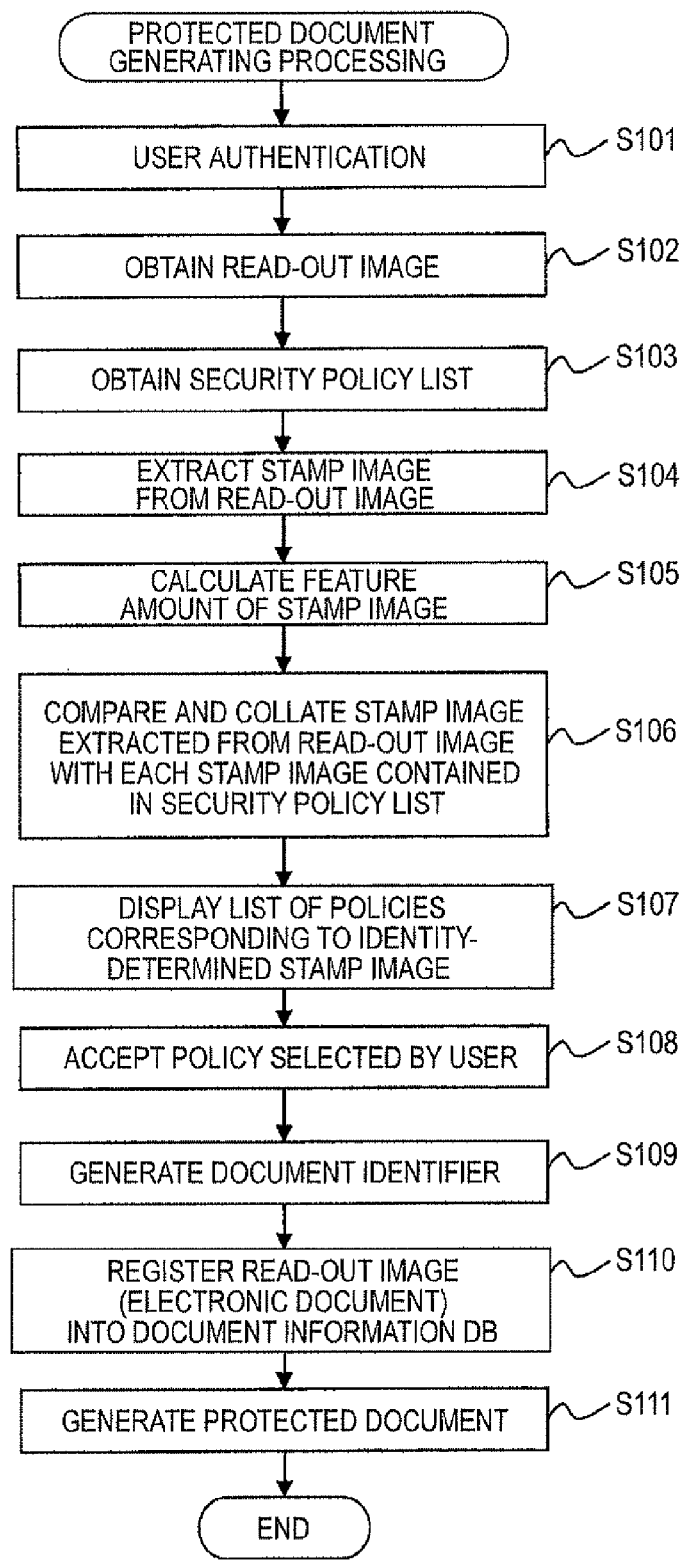
FIG. 10 is a flowchart showing protected document generating processing in the first exemplary embodiment.

Next, the operation of this exemplary embodiment will be described. This exemplary embodiment is characterized in the stamp registration processing, however, before the stamp registration processing, the protected document generating processing for setting a policy to an electronic document generated by reading out a paper document will be described with reference to the flowchart of FIG. 10.

Paper document of plural sheets to which stamps are affixed is placed on the platen of the multifunction machine 4 by the user, and executes a predetermined operation to start a scan protecting application. When the scan protecting application is started, the user authentication unit 51 prompts the user to input his/her user ID and a password by displaying a predetermined authentication screen on the operation panel 33 or the like. When the user inputs the user ID and the password in response to this prompt, the user authentication unit 51 accepts the user ID and the password, and transmits them to the user authentication server 1 to execute user authentication (step 101).

When the paper document is scanned by the scanner 34 after the user authentication, the image reader 52 obtains a read image of the paper document (step 102). Subsequently, the policy information obtaining unit 53 transmits a policy list obtaining request. By containing the user ID of the user concerned into the policy list obtaining request, only the policy information related to the user concerned may be contained in the policy list.

The security policy list response unit 42 of the security policy server 2 searches the policy information registered in the security policy data base 45, generates a list of policies and returns the generated policy list to the request transmission source. As described above, the policy information obtaining unit 53 obtains a list of security policies (step 103). The security policy list contains a list of policy names, and also contains at least associated stamp images and image feature data.

Subsequently, the policy selector 54 extracts the stamp image from the read image of the paper document (step 104), and calculates a feature amount (step 105). The extraction of the stamp image and the calculation of the feature amount may be performed by using existing techniques. Furthermore, the processing of obtaining a list of security policies and the processing of obtaining the read image of the paper document and calculating the feature amount of the stamp image may be simultaneously executed in parallel. The policy selector 54 compares and collates the calculated feature amount with the image feature data transmitted from the security policy server 2, that is, the feature amount of the stamp image which has been already registered, thereby determining the degree of similarity and selecting a policy identified as the same (step 106). When the stamp image is transmitted from the security policy server 2, it is necessary to calculate the individual feature amount from each stamp image. The policy inquiring unit 55 displays the information concerning the policy selected by the policy selector 54 on the operation panel 33 (step 107). When the user selects a policy to be applied to the read paper document from the displayed policies, the policy inquiring unit 55 accepts the policy concerned (step 108). Subsequently, the document identifier generator 56 generates the document ID (document identify) to all the pages of the paper document (step 109). The document information register 57 transmits to the security policy server 2 a registration request containing information including a set of the generated document ID, the policy ID of the selected policy and the user ID of the user concerned, thereby registering the document information concerning the read paper document into the document information data base 46 (step 110).

That is, when accepting the registration request from the multifunction machine 4, the security policy register 41 in the security policy server 2 registers the set of the document ID, the policy ID and the user ID contained in the registration request as a new record into the document information data base 46. The data and hour to be set in the creation data and hour may be transmitted by the multifunction machine 4 while contained in the registration request, or the security policy server 2 may set the date and hour at which the registration request is received or the like.

As described above, when the document information concerning the read paper document is newly registered in the document information data base 46, the protected document generator 58 allocates the document ID to the electronic document of the read paper document and encrypts the electronic document to generate the protected electronic document, and stores the electronic document into the protected document storing unit 59 (step 111).

Thereafter, the user accesses the multifunction machine 4 by using the client PC 3, takes out the protected document from the protected document storing unit 59, and uses the take-out protected document.

In this exemplary embodiment, the multifunction machine 4 obtains the policy list, and the stamp image is compared and collated in the policy selector 54. However, the exemplary embodiment may be modified so that the processing function in the policy selector 54 is provided to the security policy server 2, a stamp image extracted from the read image of the paper document is transmitted to the security policy server 2 and the image comparison and collation may be performed at the security policy server 2 side. In this case, it is unnecessary to contain a stamp image or image feature data in the policy list.

Figure 11:
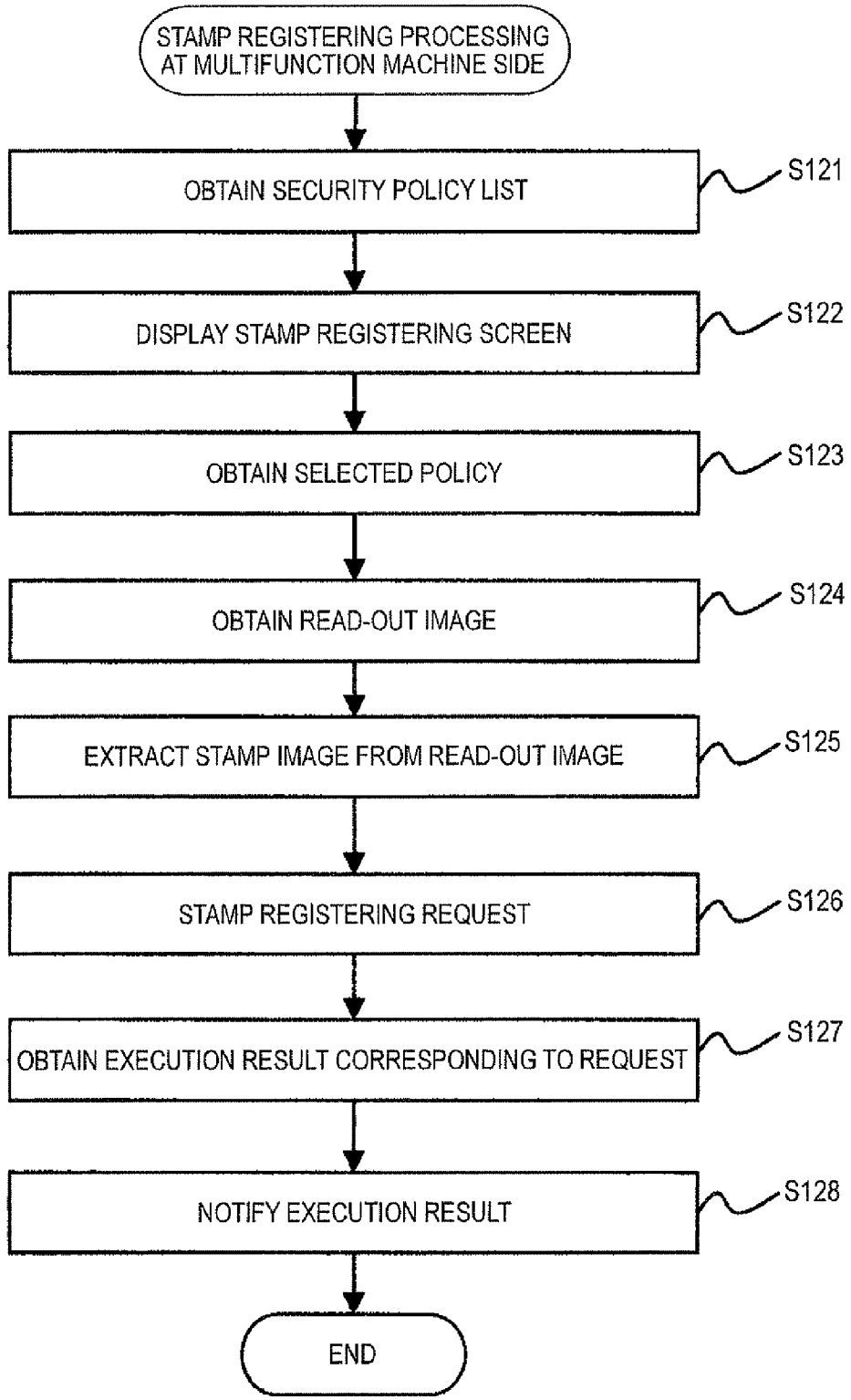
FIG. 11 is a flowchart showing stamp image registration processing at the multifunction machine side of the first exemplary embodiment.

As described above, in order to set a read image (electronic document) of a paper document as a document management target by setting a policy to the read image of the paper document, it is necessary to register the image of the same stamp as the stamp affixed to the paper document in the security policy data base 45 in advance. Here, the registration processing of the stamp image into the security policy data base 45 will be described with reference to flowcharts shown in FIGS. 11 and 12.

Figure 13:
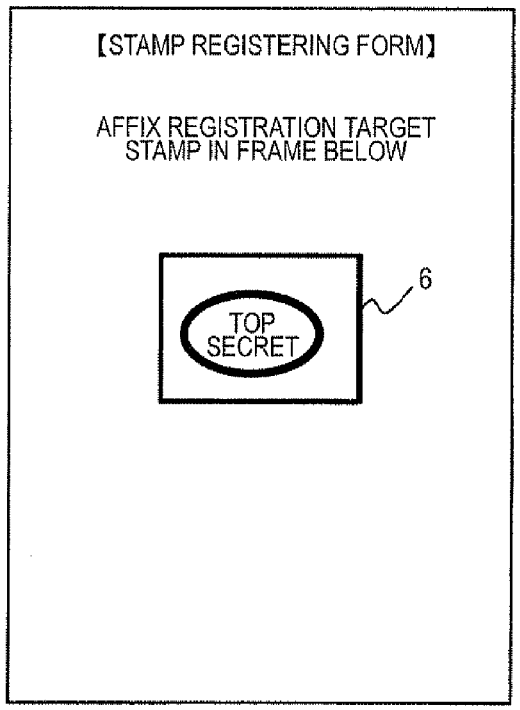
FIG. 13 is a diagram showing an example of a stamp registering form used in the first exemplary embodiment.

The user affixes a stamp to be newly registered into a predetermined frame 6 of the stamp registering form shown in FIG. 13, places this stamp registering form on the platen of the multifunction machine 4 and executes a predetermined operation, whereby the stamp registering application is started. When the stamp registering application is started, the policy information obtaining unit 63 transmits a policy list obtaining request.

The security policy list response unit 42 in the security policy server 2 searches the policy information registered in the security policy data base 45, generates a policy list and returns the generated policy list to a request transmission source.

Figure 14:
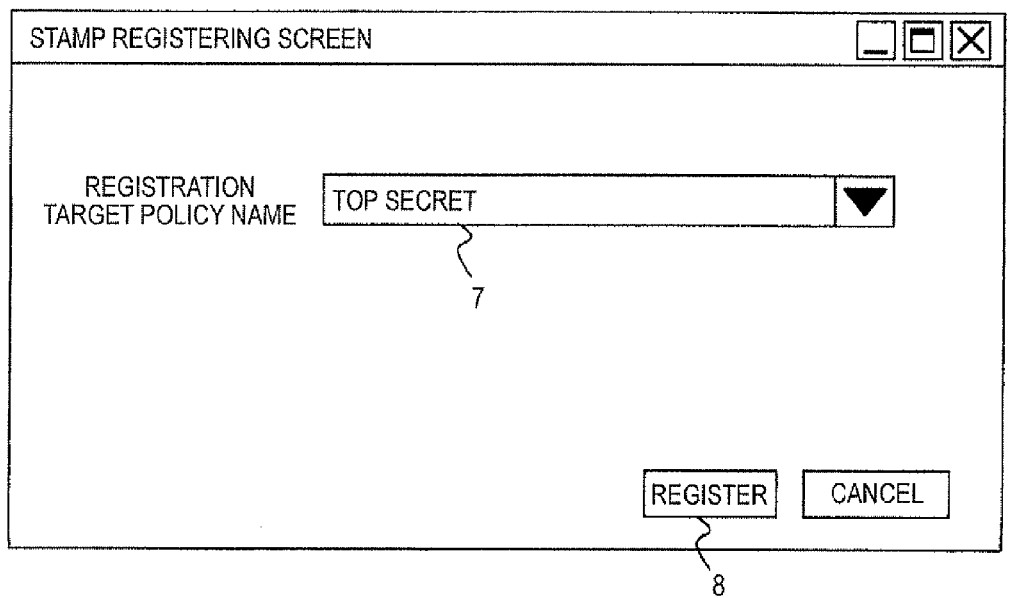
FIG. 14 is a diagram showing an example of a stamp registering screen displayed on an operation panel in the first exemplary embodiment.

As described above, when the policy information obtaining unit 63 obtains a list of security policies (step 121), the policy inquiring unit 64 displays a stamp registering screen as shown in FIG. 14 on the operation panel 33 (step 122). The stamp registering screen is provided with an input field 7 on which a list of policy names obtained from the security policy server 2 can be displayed in a drop-down list style, and the user selects from the list a policy which the user wants to allocate to the stamp affixed to the stamp registering form. FIG. 14 shows a case where a policy whose name is "top secret" is selected. When the user selects a registering button 8 after selecting the policy, the policy inquiring unit 64 obtains the selected policy (step 123). When the policy is selected, the image reader 61 obtains a read image of the stamp registering form (step 124). The stamp extracting unit 62 extracts the image of the stamp affixed in the predetermined frame 6 from the read image of the stamp registering form (step 125). The stamp registering request unit 65 transmits the stamp registering request containing the extracted stamp image and the policy ID of the selected policy to the security policy server 2 (step 126).

Figure 12:
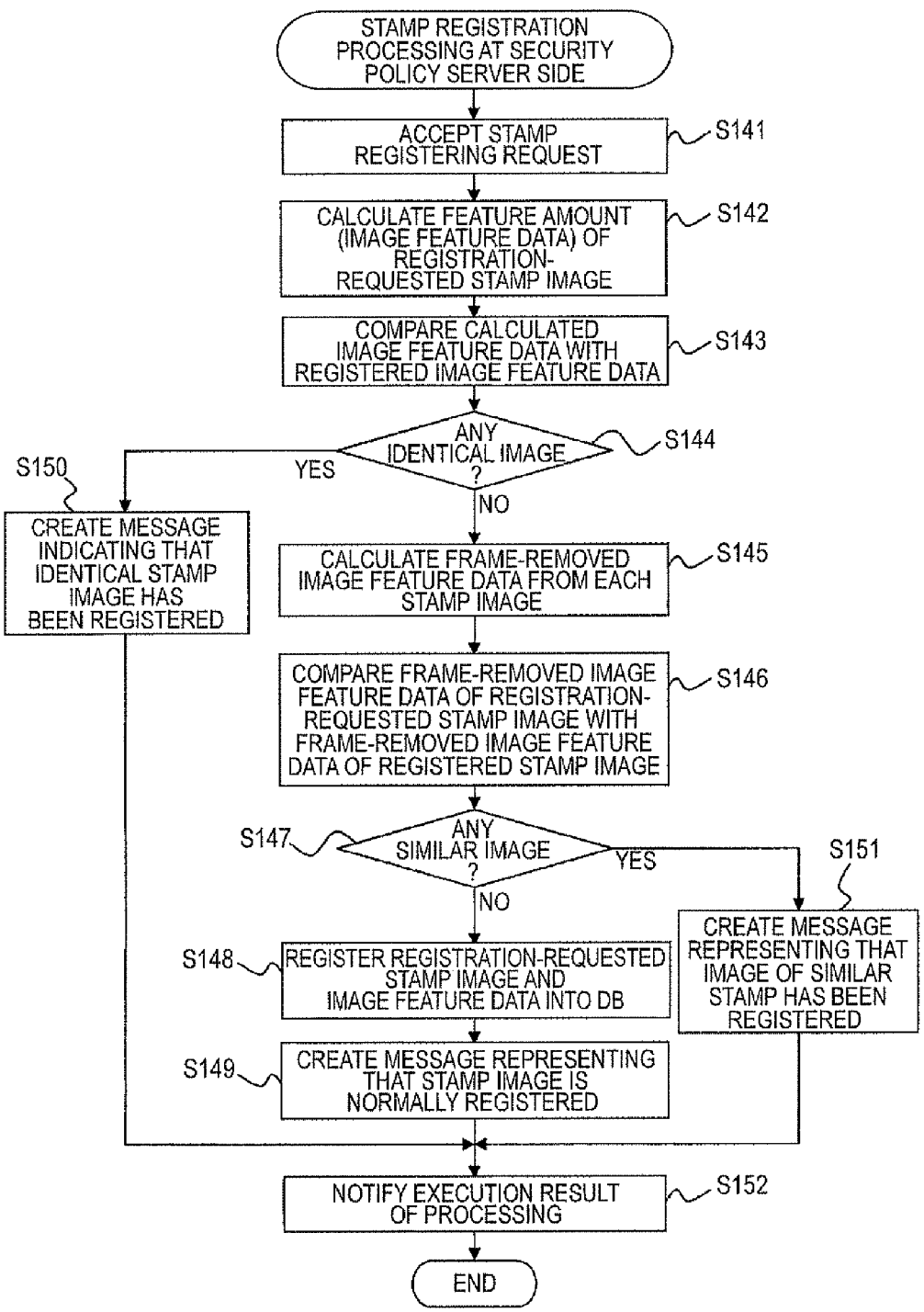
FIG. 12 is a flowchart showing stamp image registration processing at a security policy server side of the first exemplary embodiment.

In FIG. 12, when accepting the stamp registering request transmitted from the multifunction machine 4 (step 141), the stamp register 44 generates the image feature data of the stamp image contained in the stamp registering request (step 142). The stamp register 44 reads out from the security policy data base 45 respective image feature data associated with policies IDs other than the policy ID contained in the stamp registering request, and compares the generated image feature data with each of the read image feature data (step 143). When degree of similarity between the registration-requested stamp and any one of read stamps is high (step 144: Yes), the stamp register 44 creates a message representing there is a stamp which is determined to be identical to the registration-requested stamp, such as "an identical stamp has been registered in association with another policy", for example (step 150).

When the image of a stamp which can be determined to be identical to the registration-requested stamp is not registered in the security policy data base 45 (step 144: No), the stamp register 44 removes the frame from the registration-requested stamp image and then calculates the feature amount. With respect to the images of the respective stamps associated with the policy IDs other than the policy ID contained in the stamp registering request, the frame is likewise removed from each stamp image and then each feature amount is calculated (step 145). The image of the registration-requested stamp from which the frame is removed is compared with the image of each registered stamp from which the frame is likewise removed (step 146). When it is determined that degree of similarity between the registration-requested stamp and any one of registered stamp is high (step 147: Yes), the stamp register 44 creates a message representing existence of a similar stamp, such as "a similar stamp has been registered in association with another policy" (step 151).

The degree of similarity of the stamp image will be described in detail later. The feature amount of the frame-removed stamp image used for determination of similarity in step 147 may be calculated and then registered as similar image feature data in the security policy data base 45 in advance. For the purpose of the identity determination and the similarity determination of the stamp image, the stamp registration requesting unit 65 may transmit the stamp registering request while the feature amount of the stamp image and further the feature amount of an image obtained by removing the frame from the stamp image concerned are contained in the stamp registering request in place of the stamp image.

When it is determined that no similar stamp image is registered in the security policy data base 45 (step 147: No), the stamp register 44 registers, into the security policy data base 45, the stamp image contained in the stamp registering request and further the feature amount (image feature data) of the stamp image concerned in association with the policy ID contained in the stamp registering request (step 148). Then, the stamp registering unit 44 creates a message representing that these data have been normally registered, such as "stamp is normally registered" (step 149).

As described above, the image of the new stamp is newly registered in the security policy data base 45 in association with the policy. In order to newly register the image of a stamp, the user is required to register policy information containing neither stamp image nor image feature data (respective empty fields) into the security policy data base 45 in advance. By executing the processing described above, the stamp image and the image feature data are registered into the corresponding empty fields of the policy information.

As described above, when the registration processing of the stamp image is executed in response to the transmitted stamp registering request, in order to return an execution result of the registration processing, the stamp register 44 returns the message created in any one of the steps 149, 150 and 151 to the multifunction machine 4 of the stamp registration request source (step 152).

In this exemplary embodiment, when the security policy data base 45 is searched to check existence of an identical or similar stamp image, only the policy information corresponding to the policy IDs other than the policy ID contained in the stamp registering request is set as a search target. That is, when the same or similar stamp image is registered in only the policy information corresponding to the policy ID contained in the stamp registering request, the registration-requested stamp image is registered. In this case, a stamp image to be newly registered may be additionally registered in association with the policy ID thereof. That is, in this case, plural stamp images are registered in association with the policy ID concerned. Alternatively, an existing stamp image may be overwritten by a stamp image to be newly registered. In this case, the policy ID is registered in association with only one stamp image at all times.

Furthermore, in order to restrict persons who can register stamp images, only predetermined persons are allowed to register, and user authentication is executed in the first step. When a similar stamp image is registered in step 148, the multifunction machine 4 is made to display an alarm indicating that the similar stamp image is registered, thereby prompting the user to confirm whether the similar stamp image should be registered or not.

Returning to FIG. 11, when the stamp registration requesting unit 65 obtains, from the security policy server 2, the message representing the execution result of the registration processing executed in response to the stamp registering request (step 127), the registration result notifying unit 66 notifies to the user by displaying the message on the operation panel 33 or the like (step 128). The destination to be notified is not limited to the multifunction machine 4 used by the user, and the message may be notified to the client PC 3 of the user through a communication unit such as an electronic mail, stored in a predetermined folder for the user or transmitted to a predetermined destination by FAX.

Figure 15:
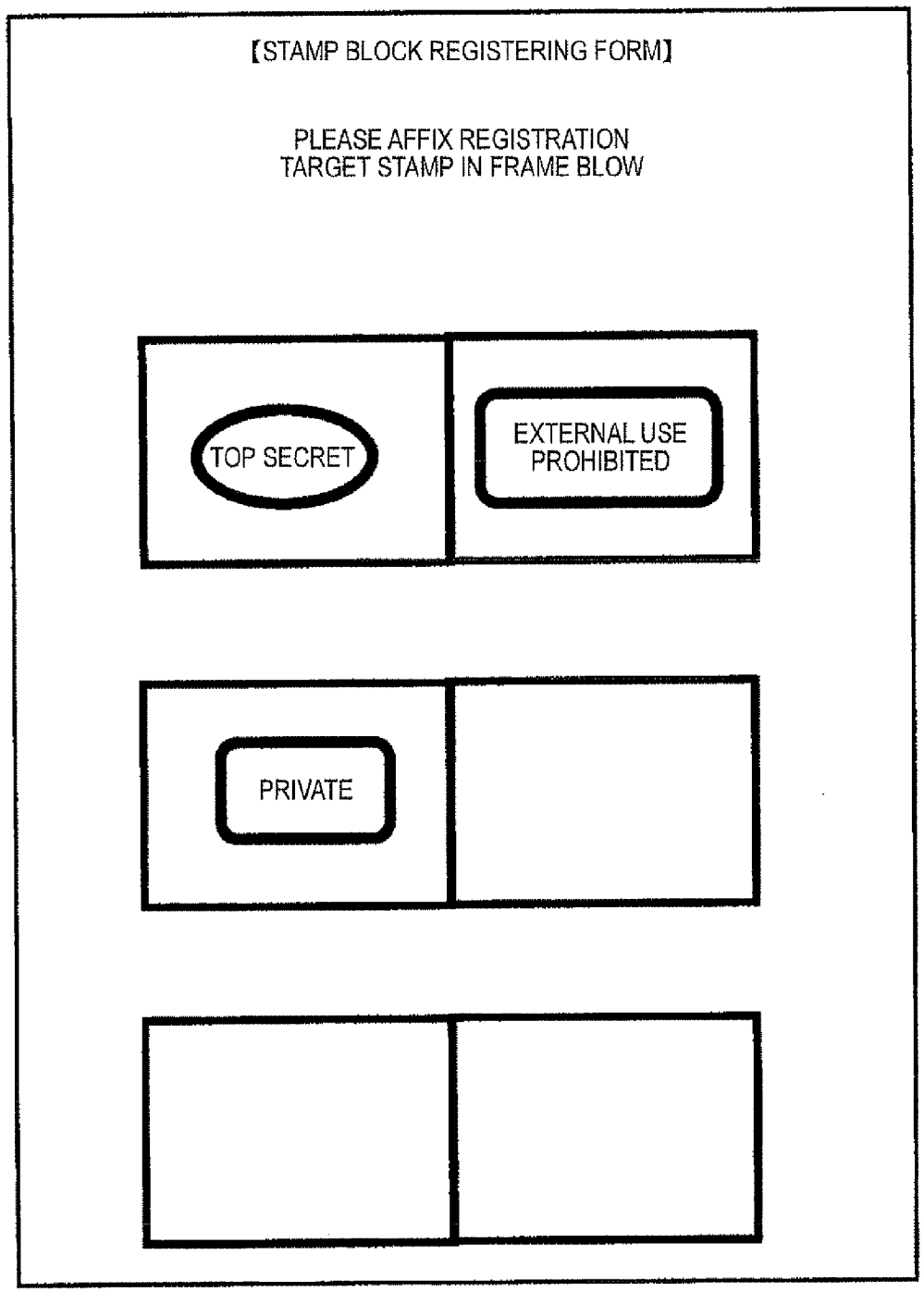
FIG. 15 is a diagram showing another example of the stamp registering form used in the first exemplary embodiment.

In this exemplary embodiment, the stamp images and the policies are registered in one-to-one correspondence in the security policy data base 45 by using the stamp registering form shown in FIG. 13. However, the stamp images and the policies may be registered while plural stamp images are associated with one policy by using the stamp registering form shown in FIG. 15, for example.

Here, the degree of similarity of the stamp image will be described.

In the foregoing description, when the identity is determined as a comparison result of the stamp image from which the frame contained in the stamp image is removed, it is determined that the stamp images are similar to each other (steps 146, 147 of FIG. 12). That is, when the frame-removed image of the registration-requested stamp is determined as being identical to the frame-removed image of some stamp registered in the security policy data base 45, it is determined that the image of a stamp similar to the image of the registration-requested stamp has been already registered in the security policy data base 45. In this case, with respect to determination as to whether the stamp images are similar or not, the stamp images may be also determined as being similar to each other in cases other than the above case where the frame is removed. FIGS. 16A to 16F are diagrams showing an example of a pattern of similar stamp images.

Figure 16A:
FIGS. 16A to 16F are diagrams showing an example of a pattern of similar stamp images in the first exemplary embodiment.

First, FIG. 16A shows a case where the frame shape is different between both the stamp images. This case corresponds to the above example in which the frame is removed. This case contains such a case that one of the stamp images has no frame from the beginning. In this case, a part of an image, that is, a frame may be removed by image processing, and it may be determined whether only inner images are identical to each other or not. When a character array is contained in the frame of each stamp image, the stamp image may be converted to the character array by an OCR (Optical Character Recognition) technique, and it may be determined whether the character arrays are coincident with each other or not.

Figure 16B:
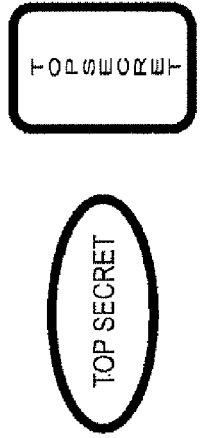

FIG. 16B shows another case where the writing direction (vertical writing/horizontal writing) is different between both the stamp images. In this case, as in the case of the different frame shape, each frame is deleted, each stamp image is converted to a character array by the OCR processing and then it is determined the character arrays are coincident with each other.

Figure 16C:

FIG. 16C shows a case where the language is different between both the stamp images. In this case, a corresponding table of corresponding words (character arrays) is provided, each stamp image is converted to a character array by the OCR processing, and then it is determined by searching the corresponding table whether the character arrays are coincident with each other. In order to make this method usable more generally, a general-purpose dictionary (English-Japanese dictionary or Japanese-English dictionary) may be used in place of the corresponding table.

Figure 16D:

FIG. 16D shows a case where color is different between both the stamp images. In FIG. 16d, one frame is represented by a broken line to represent the difference in color between both the stamp images. In this case, after color information of the stamp images is deleted by the image processing, it may be determined whether both the stamp images are identical to each other or not.

Figure 16E:
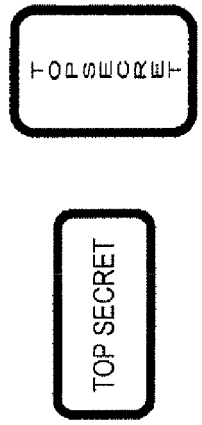

FIG. 16E shows a case where the character writing style and the frame shape are different between both the stamp images. In this case, both the processing described with respect to FIGS. 16A and 16B are executed, and the identity determination is, performed.

Figure 16F:

FIG. 16F shows a case where the same meaning is expressed by using different words. In FIG. 16F, "EXTERNAL USE PROHIBITED" and "INTERNAL USE ONLY" are different in terms, but have the same meaning. In such a case, the stamp images are converted to character arrays, and it is determined by searching a corresponding table or a dictionary of synonymous words whether both the character arrays are similar to each other or not.

As described above, in this exemplary embodiment, the presence or absence of similarity is determined by removing a part of a stamp image such as a frame or a part of image information such as color, or by converting a word identifiable from an image by using a corresponding table or a dictionary.

Second Exemplary Embodiment

In the first exemplary embodiment, the element (stamp) and the processing (viewing, edition, etc.) are associated with each other by directly associating the policy with the stamp image. However, in this exemplary embodiment, an identifier is allocated to each stamp image, and not the image of a stamp, but an identifier (stamp ID) of the stamp is associated with a security policy.

Figure 17:
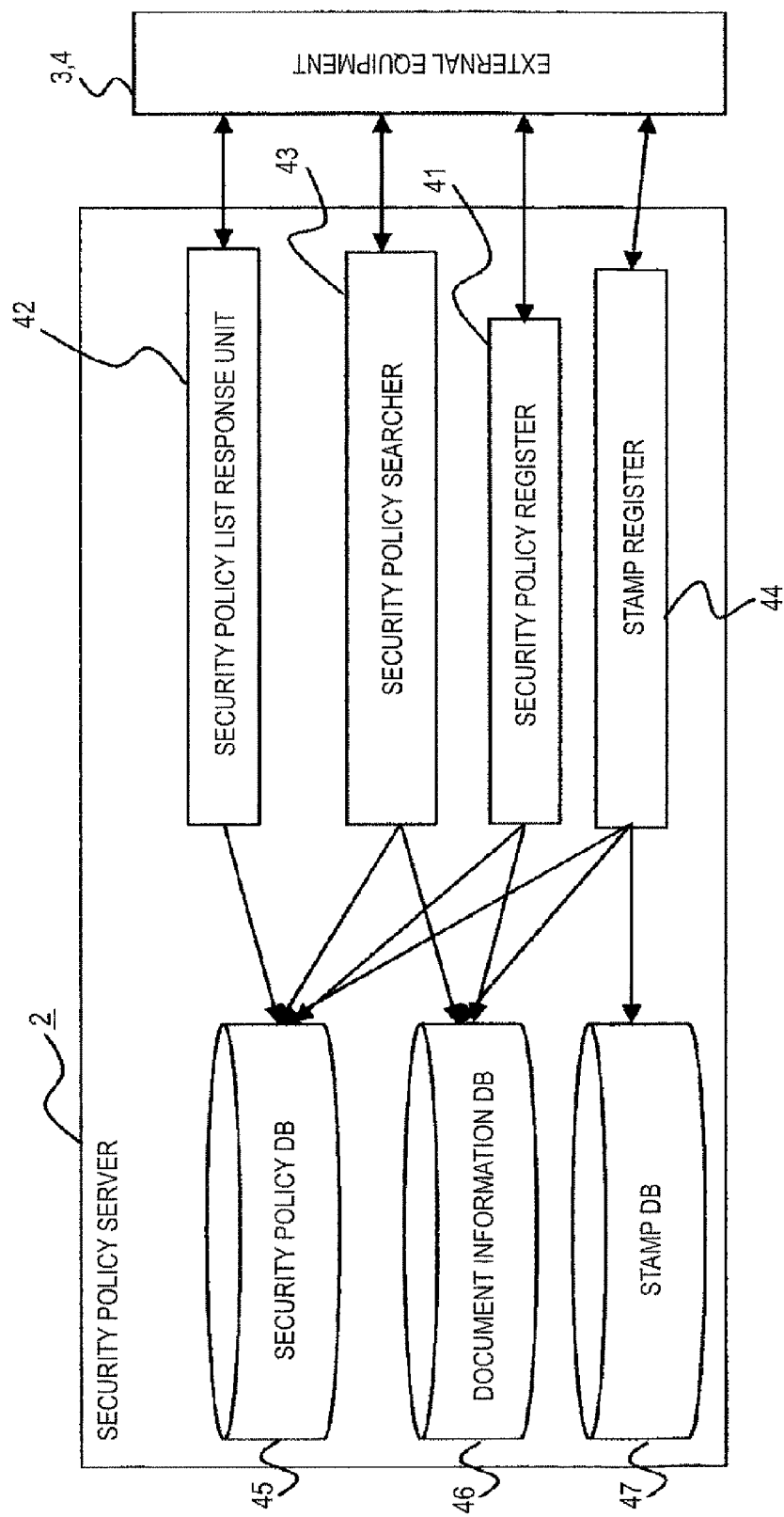
FIG. 17 is a block diagram showing a security policy server according to a second exemplary embodiment.

FIG. 17 is a block diagram showing the security policy server 2 in this exemplary embodiment. The security policy server 2 of this exemplary embodiment is constructed by providing a stamp data base (DB) 47 to the configuration of the first exemplary embodiment.

FIG. 18 is a diagram showing an example of the data structure of the stamp data base 47 in the second exemplary embodiment. Stamp information registered in the stamp data base 47 is configured by associating the identifier of a stamp (stamp ID), the name of the stamp concerned (stamp name), a stamp image and the image feature data of the stamp image with one another.

FIG. 19 is a diagram showing the data structure of the security policy data base 45 in the second exemplary embodiment. A user (usage-permitted person), a licensed (usable) function, and policy information are set in association with policy ID for identifying a policy and the name of the policy concerned in the security policy data base 45. The user and the licensed function serve to set what access should be permitted to whom, and the policy information is constructed by associating stamp ID of a stamp associated with the policy concerned.

Figure 20:
FIG. 20 is a diagram showing another example of the stamp registering form used in the second exemplary embodiment.

In a case where stamp images are managed by individually allocating an identifier to each stamp image as shown in FIG. 18, when plural stamps are registered in a lump as shown in FIG. 20, one policy is not associated with all the stamps, and a stamp may be registered every stamp identifier. That is, all the data (or a part of the data) of the stamp data base of FIG. 18 may be updated in once registration processing.

The other configuration and operation may be basically the same as the first exemplary embodiment. However, a part of the stamp registration processing is different in the following point. That is, in the security policy server 2, the policy and the stamp image are managed in the lump in the security policy data 45 in the first exemplary embodiment, however, the policy and the stamp image are managed in the security policy data base 45 and the stamp data base 47, respectively, in the second exemplary embodiment.

That is, in step 148 shown in FIG. 12, with respect to a registration-requested stamp image, the stamp register 44 generates element identification information (stamp ID) for identifying the stamp concerned, and registers the generated stamp ID, the stamp name, the stamp image and the feature amount thereof in association with one another in the stamp data base 47. Furthermore, the stamp register 44 registers the generated stamp ID in association with the policy ID contained in the stamp registering request into the security policy data base 45.

The stamp ID may be generated at the multifunction machine 4 side, and notified to the security policy server 2 while the stamp ID is contained in the stamp registration request. There may be provided a function of displaying a list of information concerning stamps registered in the stamp data base 47 at the stamp registration requesting source.

In the above exemplary embodiments, the stamp image is associated with the security policy managed in the security policy server 2. Therefore, when the processing of registering the stamp image is executed, the security policy server 2 and the multifunction machine 4 are operated in cooperation with each other. However, the above exemplary embodiments may be configured by using only one device in some kind of stamp image associating processing.

In the exemplary embodiments, the present invention is applied to the document processing system of reading out a stamp-affixed paper document, and executing predetermined processing, specifically, viewing, edition, etc. within a permitted range in accordance with the type of the stamp image extracted from the read image. However, the present invention may be applied to another system.

In the exemplary embodiments, a paper document is used as a medium. However, an image of an element may be read from another medium. Furthermore, a stamp affixed to a paper document is used as an element of an image extracted from a paper document, however, an image of another element may be extracted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the skilled in the art to understand the invention for various embodiments and with the various modifications as are suited to the particular use contemplated. It is intended that the scope of the invention be defined by the following claims and their equivalents.

What is claimed is:

1. A document processing device, comprising:
    an extraction unit that extracts a first image of an element from a read image of a medium to which the element is affixed;
    an accepting unit that accepts first information for specifying processing to be performed to a document, the first information being to be associated with the first image of the element;
    a determination unit that determines whether an image of an element identical to or similar to the first image of the element has been registered in a memory, or not; and
    a registration unit that registers the first image of the element and the first information for specifying the processing in association with each other in the memory when the determination unit determines that the image of the element identical to or similar to the first image of the element has not been registered in the memory.

2. The document processing device according to claim 1, further comprising:
    a calculation unit that calculates a feature amount of the first image of the element,
    wherein
    the registration unit registers the first image of the element in association with the calculated feature amount in the memory.

3. The document processing device according to claim 1, wherein
    the determination unit determines whether the image of the element identical to or similar to the first image of the element is registered in the memory by comparing the first image of the element with second image of an element which has been registered in the memory being associated with second information for specifying processing, the second information being different from the first information.

4. A document processing system, comprising:
    a memory that stores images of elements and processing information in association with each other;
    an extraction unit that extracts an image of an element from a read image of a medium to which the element is affixed;
    an accepting unit that accepts information for specifying processing to be performed to a document;
    a determination unit that determines whether an image of an element identical to or similar to the extracted image of the element has been registered in the memory, or not; and
    a registration unit that registers the extracted image of the element and the information for specifying processing in association with each other in the memory when the determination unit determinates that the image of the element identical to or similar to the extracted image of the element has not been registered in the memory.

5. A document processing system comprising:
    an element information memory that stores images of elements and element identification information for identifying the elements in association with each other;
    a processing information memory that stores processing information and the element identification information in association with each other;
    an extraction unit that extracts an image of an element from a read image of a medium to which the element is affixed;
    a generation unit that generates element identification information for identifying the extracted element;
    an accepting unit that accepts information for specifying processing;
    a determination unit that determines whether an image of an element identical to or similar to the extracted image of the element has been registered in the element related information memory, or not; and
    a registering unit that registers the extracted image of the element and the element identification information of the element in association with each other in the element information memory, and registers the element identification information of the element and the information for specifying the processing in association with each other in the processing information memory when the determining unit determines that the image of the element identical to or similar to the extracted image of the element has not been registered in the element information memory.

6. A non-transitory computer readable medium storing a program causing a computer to execute a process for processing a document, the process comprising:
    extracting an image of an element from a read image of a medium to which the element is affixed;
    accepting information for specifying processing to be performed to a document, the information being to be associated with the image of the element;
    determining whether an image of an element identical to or similar to the extracted image of the element has been registered in a memory, or not; and
    registering the extracted image of the element and the information for specifying processing in association with each other in the memory when it is determined that the image of the element identical to or similar to the extracted image of the element has not been registered in the memory.

7. A document processing method, comprising:
    extracting an image of an element from a read image of a medium to which the element is affixed;
    accepting information for specifying processing to be performed to a document, the information being to be associated with the image of the element;
    determining whether an image of an element identical to or similar to the extracted image of the element has been registered in a memory or not; and
    registering the extracted image of the element and the information for specifying processing in association with each other in the memory when the it is determined that the image of the element identical to or similar to the extracted image of the element has not been registered in the memory.

* * * * *